United States Patent [19]
Henslee et al.

[11] 4,440,529
[45] Apr. 3, 1984

[54] METHOD AND MEANS FOR OPERATING A DRILL FOR ELIMINATING AXIAL SCRATCHES DURING RETRACTION

[75] Inventors: Samuel P. Henslee, Idaho Falls, Idaho; Pascal J. Noronha, Loveland, Ohio; John B. Logan, Fort Worth, Tex.

[73] Assignee: General Dynamics Corporation, Fort Worth, Tex.

[21] Appl. No.: 258,920

[22] Filed: Apr. 30, 1981

Related U.S. Application Data

[63] Continuation of Ser. No. 965,625, Dec. 1, 1978, abandoned.

[51] Int. Cl.³ ................... B23B 45/04; B23B 45/14
[52] U.S. Cl. ............................ 408/1 R; 173/19; 173/32; 408/9; 408/10; 408/130
[58] Field of Search ............... 408/9, 10, 14, 79, 112, 408/130, 1; 173/19, 32, 155

[56] References Cited

U.S. PATENT DOCUMENTS

| | | | |
|---|---|---|---|
| Re. 23,822 | 5/1954 | Eschenburg et al. | 408/130 X |
| 2,488,992 | 11/1949 | Taylor | 408/112 X |
| 2,604,759 | 7/1952 | Smith | 408/130 X |
| 2,873,630 | 2/1959 | Eschenburg et al. | 408/10 |
| 2,909,949 | 10/1959 | Winslow | 408/10 |
| 3,526,158 | 9/1970 | Adams et al. | 408/9 |

OTHER PUBLICATIONS

A. B. Quackenbush Co., Manual for Drill Series 15QDA-RA-SU.

Primary Examiner—Z. R. Bilinsky
Attorney, Agent, or Firm—Arthur F. Zobal

[57] ABSTRACT

A drill employed for drilling holes in airframes is provided with means to rotate the drill bit during retraction and means to control the rate of retraction of the drill bit from the hole in a manner to prevent the formation of axial scratches in the wall of the hole.

9 Claims, 14 Drawing Figures

PRIOR ART
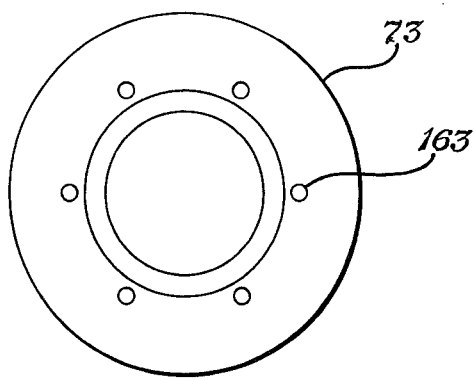
Fig.6
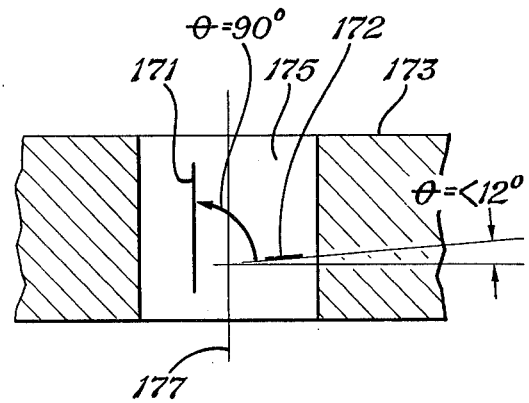
Fig.7
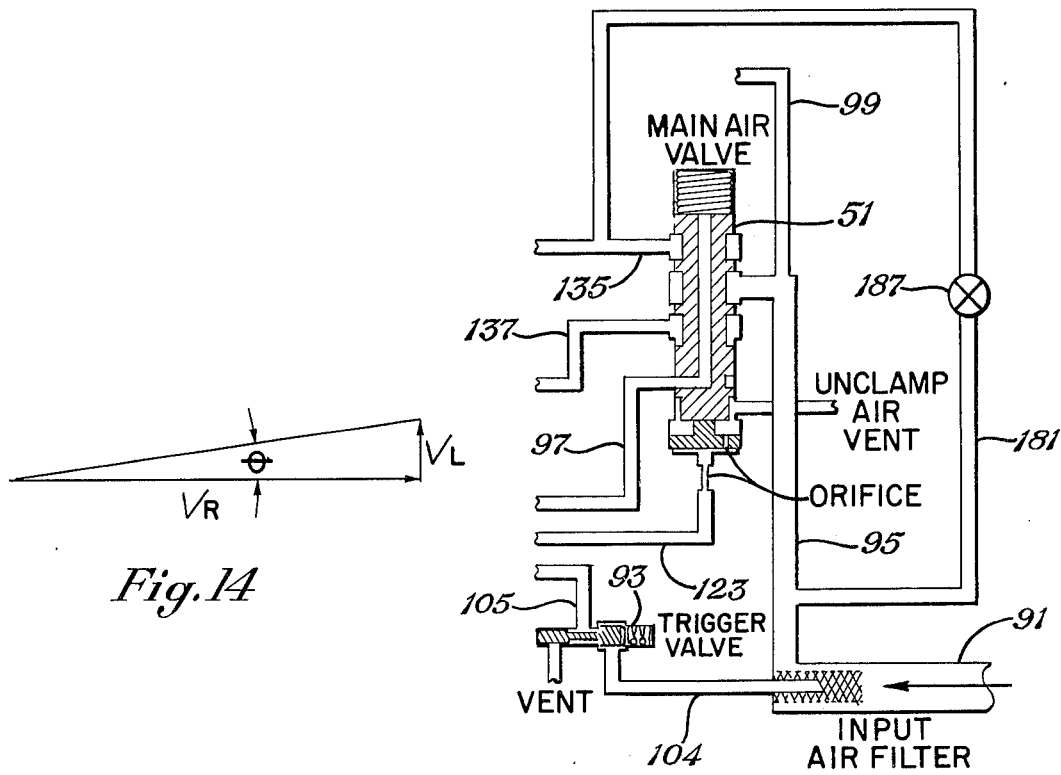
Fig.14
Fig.10

METHOD AND MEANS FOR OPERATING A DRILL FOR ELIMINATING AXIAL SCRATCHES DURING RETRACTION

This application is a continuation, of application Ser. No. 965,625, filed Dec. 1, 1978, now abandoned.

BACKGROUND OF THE INVENTION

1. Field of the Invention

The present invention relates to the automatic drills of the type having feed and retract mechanisms for feeding a drill bit into a workpiece and for removing the drill bit from the resulting hole.

The predominant location for fatigue cracks in airframe structures are fastener holes. According to the present invention, our investigation has shown that the main cause of fatigue cracking in fastener holes are axial scratches produced upon retraction of the drill bit without simultaneous rotation. In many instances, we have foung that these fatigue critical scratches are not visible to the naked eye and are visible only when optically magnified. The axial scratches also occur in instances where the ratio of linear velocity relative to the surface rotational velocity of the drill bit during retraction is high.

2. Description of the Prior Art

One type of drill that has produced the undesirable axial scratches is the Winslow Spacematic Drill, models HS1 and HS2. This drill is a hand held air operated drill that produces close tolerance holes at speeds varing from 3600 to 8000 r.p.m. In its prior manner of operation, the air motors were turned off upon reaching a preset position during the feed stroke and the drill bit retracted immediately. This manner of operation during the retract mode has resulted in severe damage to the wall of the fastener hole. Damage in order of severity to fatigue behavior are abundant axial scratches, gouges, fluting marks, and surface roughness and waviness. The damage appears to be induced by the drill bit itself or by the drill bit axially pulling metal chips, that are cold worked and thus harder than the parent material, through the hole during the retract mode, scarring the surface.

Another drill observed which has produced axial scratches during the retract mode is a drill of the type manufactured by Quackenbush. One such drill rotates during retraction, however, the rotational speed during retraction is about 660 r.p.m. and the linear retraction rate is even faster than that of the Winslow drill.

SUMMARY OF THE INVENTION

It is an object of the present invention to provide a method and structure for operating a drill during retracting in a manner to prevent the formation of axial scratches in the wall of the hole.

It is another object of the present invention to provide a method and structure for operating a drill during retraction whereby the ratio $V_L/V_R$ is such that axial scratches are eliminated and any circumferential scratches produced during retraction are within acceptable limits, wherein $V_L$ is the linear velocity of the drill bit at its axis during retraction and $V_R$ is equal to the product of the radius of the drill bit and its angular velocity during retraction. It has been found that the desired results can be achieved if the ratio $V_L/V_R$ is less than 0.22.

The structure of the present invention comprises means for rotating the drill bit during retraction and means for controlling the rate of retraction of the drill bit from the hole in a manner such that the ratio $V_L/V_R$ is less than 0.22.

BRIEF DESCRIPTION OF THE DRAWINGS

FIG. 6 illustrates the front side of the hydraulic piston of the standard drill of FIGS. 1 and 2.

FIG. 7 is a cross-section of a hole drilled through an airframe structure.

FIG. 10 is a portion of the right side of FIG. 3 illustrating an auxiliary air line.

FIG. 14 is a vector diagram of velocity components of a drill bit upon retraction.

DESCRIPTION OF A PRIOR ART DRILL

Figure 1:
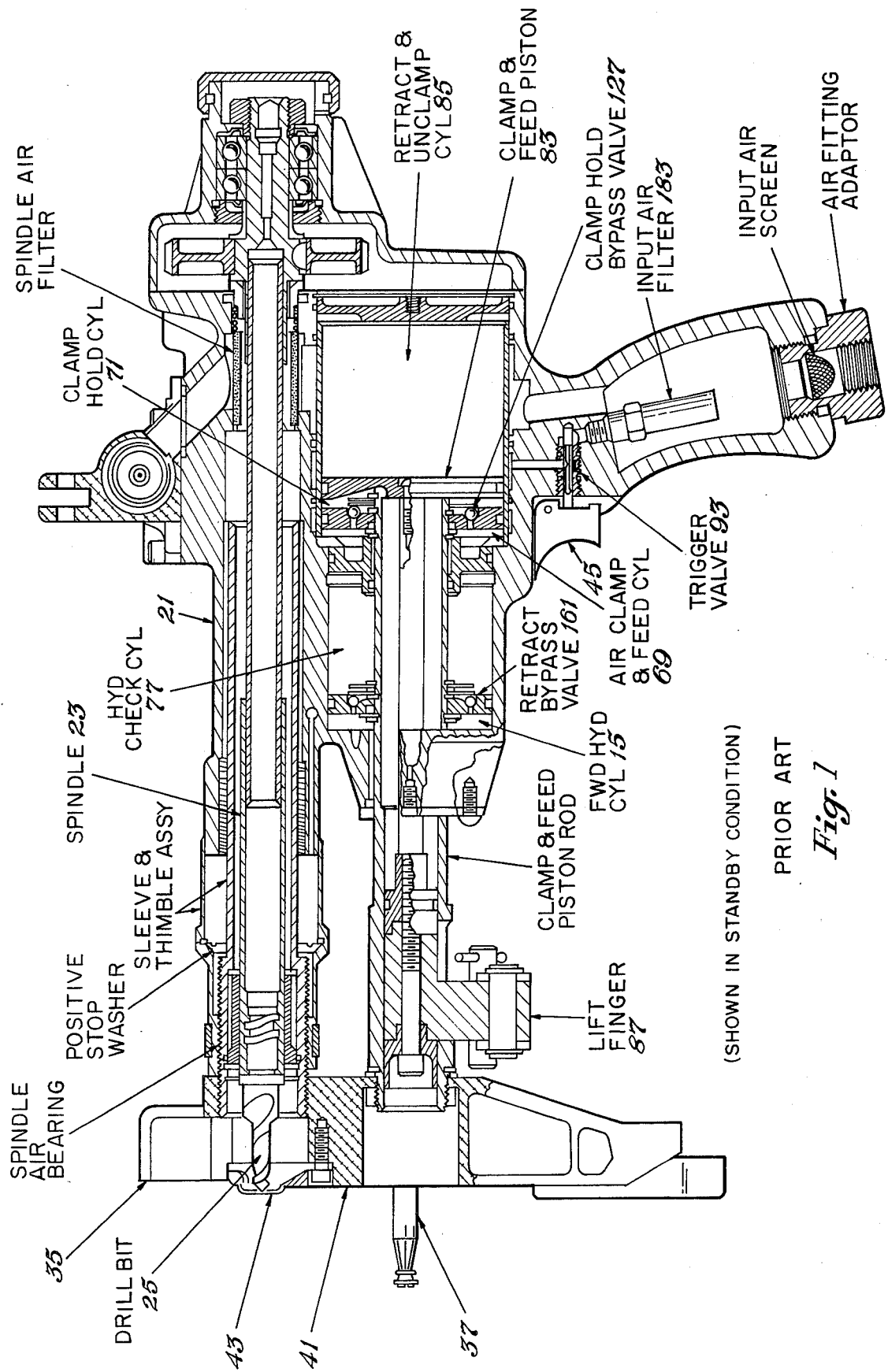
FIG. 1 is a cross-sectional side view of a standard Winslow Spacematic Drill in a standby condition.
Figure 2:
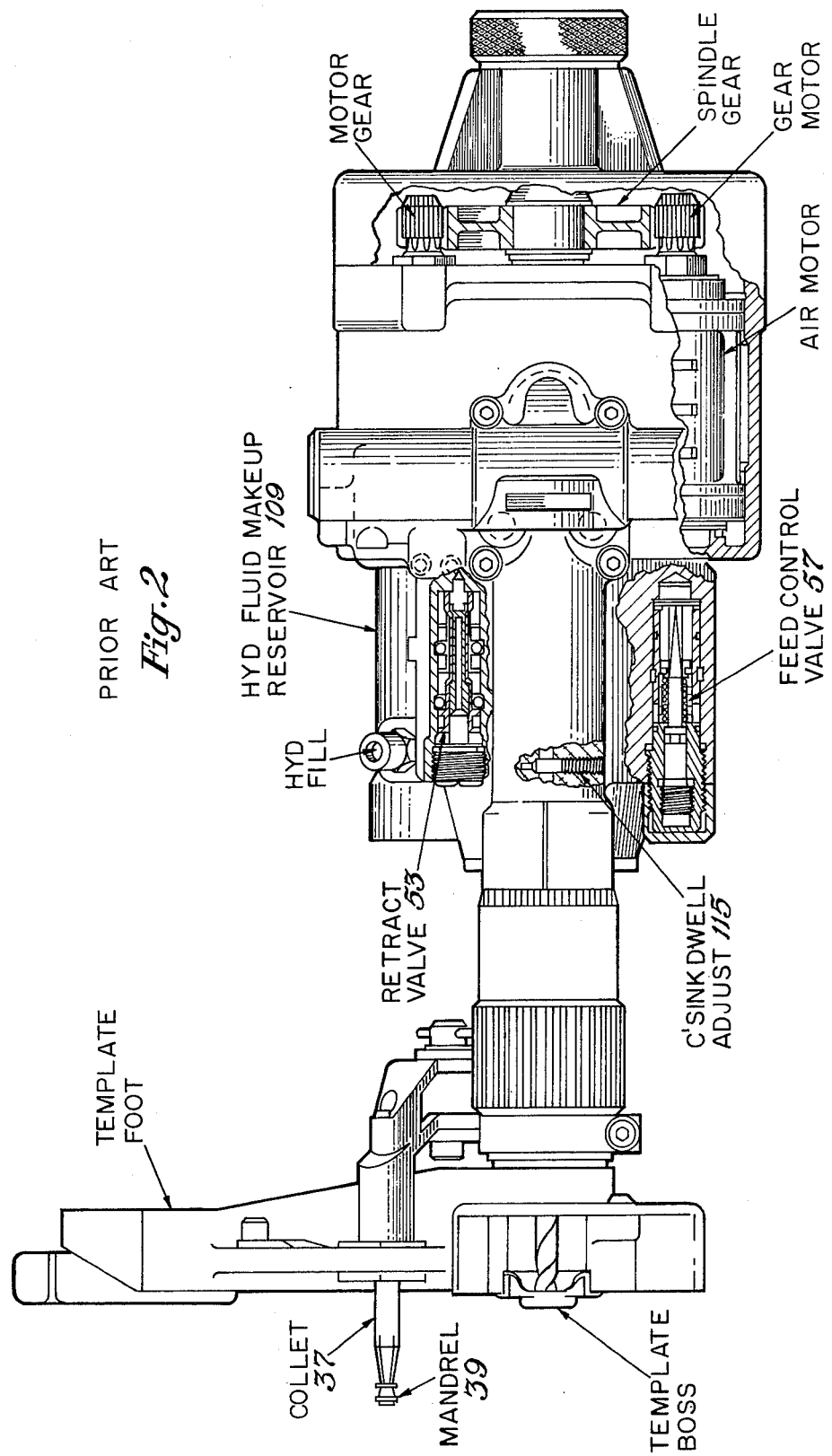
FIG. 2 is a top view of the drill of FIG. 1 shown partially in cross-section.

Referring now to FIG. 1, there will be described briefly the manner of operation of the conventional hand held Winslow Spacematic Drill, now manufactured by Deutsch Fastener Corporation, Los Angeles, Calif. The drill comprises a housing 21 supporting a rotatable spindle 23 and drill bit 25. Air motors 27 and 29 are provided for rotating the spindle 23 and hence the drill bit 25 through gears 31-33. A workpiece engaging member 35, also called a foot, is located at the front of the drill. A collet 37 and mandrel 39 extend through the foot. The housing 21 and the foot 35 are linearally movable relative to each other in a telescoping manner for feed and retract purposes. In the standby or fully retracted condition, the housing 21 and foot 35 are in a fully extended condition whereby the drill bit 25 does not extend beyond the front face 41 of the foot 35. In the feed mode, the foot 35 and housing 21 move toward each other causing the drill bit 25 to move through an aperture 43 formed in the foot and beyond its front face 41 for drilling purposes. In operation, the front face 41 of the foot 35 is placed against the workpiece with the collet 37 located in a guide hole formed in the workpiece. The trigger 45 is pulled to initiate the operation of the tool. Initially, the air motors 27 and 29 are operated to rotate the spindle 23. The mandrel 39 is drawn into the collet 37 to expand its fingers against the workpiece and the mandrel 39 and collet 37 are moved backward together to clamp the tool to the workpiece. The housing 21, spindle 23, and drill bit 25 then are moved forward to start the feed stroke. Upon completion of a preset feed stroke, the air motors 27 and 29 are shut off and the housing, spindle, and drill bit are moved rearward to withdraw the drill bit from the hole.

A pneumatic system, including a main air valve 51, a retract valve 53 and a pneumatic cylinder 55 are provided for controlling the air motors, the clamp and feed stroke, and the retract stroke. A hydraulic system including a feed control valve 57 and a hydraulic cylinder 59 are provided for controlling the rate of the feed stroke. Cylinders 55 and 59 are divided by a wall 61. A tubular piston rod 63 is connected to the foot 35 and extends through wall 65 into the cylinder 59 and through wall 61 into cylinder 55. A piston 67 is connected to the rear end of the piston rod 63 and is located in the cylinder 55 defining an air clamp and feed cylinder 69 and a clamp and hold cylinder 71 (see FIGS. 4 and 5). A piston 73 is connected to the forward portion of the piston rod 63 and is located in the cylinder 59 defining a forward hydraulic cylinder 75 and a hydraulic check cylinder 77. Both pistons 67 and 73 move together as the piston rod 63 and hence the foot 35 move relative to the housing 21. Located in the tubular piston rod 63 is a solid piston rod 81 having a clamp and feed piston 83 connected to its rear end and which is located in cylinder 55 defining the clamp and hold cylinder 71 and also a retract and unclamp cylinder 85. The forward end of the piston rod 81 is connected to a lift finger 87 which controls the collet 37 and mandrel 39. Piston 83 and its rod 81 can move forward and rearward a short distanct relative to pistons 67 and 73 and rod 63.

Figure 3:
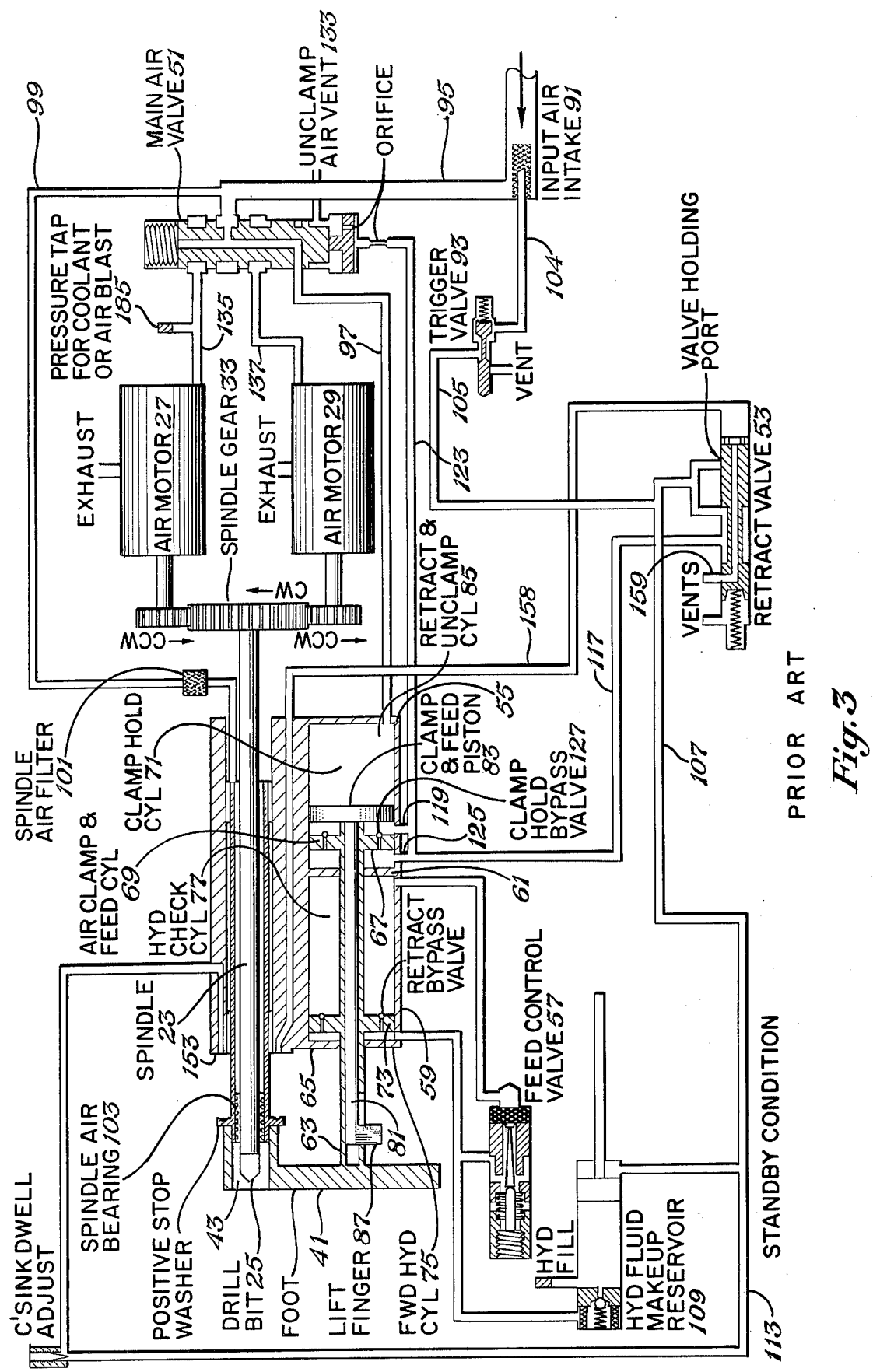
FIG. 3 illustrates the pneumatic and hydraulic systems of the drill of FIGS. 1 and 2 in a standby condition.

Referring to FIG. 3, in the standby condition, air pressure is applied through conduit 91 to the handle of the tool and the trigger valve 93 is closed. Input air pressure is applied by way of conduit 95 through the main air valve 51 and by way of conduit 97 to the retract and unclamp cylinder 85 and holds the tool retracted. Most of the hydraulic fluid has been forced into the hydraulic check cylinder 77. Air pressure also passes by way of conduit 99 through the spindle air filter 101 to the spindle air bearing 103. This pressure is present for all cycles of operation.

Figure 4:
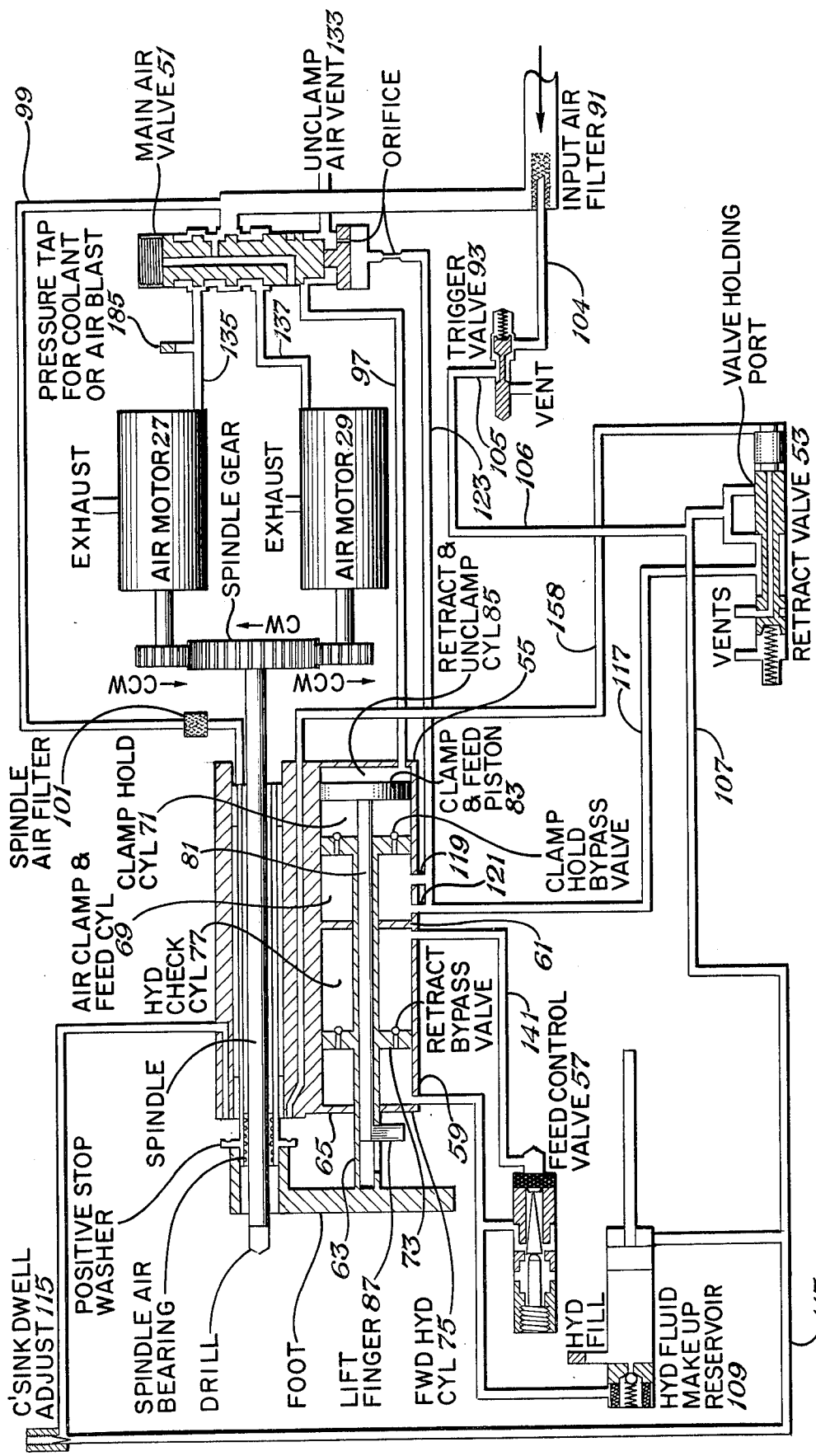
FIG. 4 illustrates the pneumatic and hydraulic systems of the drill of FIGS. 1 and 2 in the feed and clamp mode.

Referring to FIG. 4, the tool operates during the clamp and feed stroke in the following manner. The trigger 45 is pulled, opening the trigger valve 93. Air pressure is applied by way of passage 104, trigger valve 93, conduit 105 and conduits 106 and 107 to the hydraulic fluid makeup reservoir 109. This pressure acts on the reservoir piston 111 to take up any slack in the hydraulic system. Air pressure also is applied by way of conduit 113 to the countersink dwell adjust 115. This is sensing pressure used at the end of the feed stroke to initiate the retract stroke.

In addition, the air pressure is applied through the retract valve 53 to the air clamp and feed cylinder 69, clamp and hold cylinder 71 and to the piston in the main air valve 51. The flow of air from the retract valve 53 is by way of conduit 117 and ports 119 and 121 to the air clamp and feed cylinder 69 and by way of conduit 123 to the main air valve 51. From the air clamp and feed cylinder 69, the air flows through apertures 125 (See FIGS. 3) formed through the piston 67 and past the clamp and hold bypass valve 127 into the clamp and hold cylinder 71. Athough not shown, there are six apertures 125 formed through the piston 67. The valve 127 is a one way valve (O-ring) that allows air to pass through apertures 125 only from the left to the right as seen in FIG. 4.

Air pressure applied to the piston in the main valve 51 shifts the spool valve. This vents the retract and unclamp cylinder 85 and applied air pressure to the two air motors 27 and 29. The air motors then start rotating the spindle 23. The retract and unclamp cylinder 85 is vented by way of conduit 97, main valve 51, and vent 133. The air pressure is applied to the two air motors 27 and 29 from valve 51, by way of conduits 135 and 137.

The air pressure acts on the clamp and feed piston 83 and causes it to move to the right as seen in FIGS. 3 and 4 a short distance relative to the piston 67. This raises the lift finger 87 and causes the lift finger to draw the mandrel 39 into the collet 37 and then move both the mandrel 39 and collet 37 together rearward thus clamping the tool to the workpiece.

Air pressure builds up in the air clamp and feed cylinder 69 and forces the housing 21 and hence the spindle 23 and drill bit 25 forward, thus starting the feed stroke. During the feed stroke, the clamp and hole bypass valve 127 permits unrestricted flow of air from the clamp and feed cylinder 69 into the clamp and hold cylinder 71.

The forward motion (feedstroke) of the housing 21 is controlled by the hydraulic check cylinder 77. Hydraulic fluid flows from the check cylinder 77 through the feed control valve 57 to the forward hydraulic cylinder 75. Flow is by way of conduit 141, valve 57 and conduit 143. The rate of feed is controlled by the feed control valve 57. This valve holds the feed rate constant by sensing the hydraulic flow rate and opening and closing as required.

Figure 5:
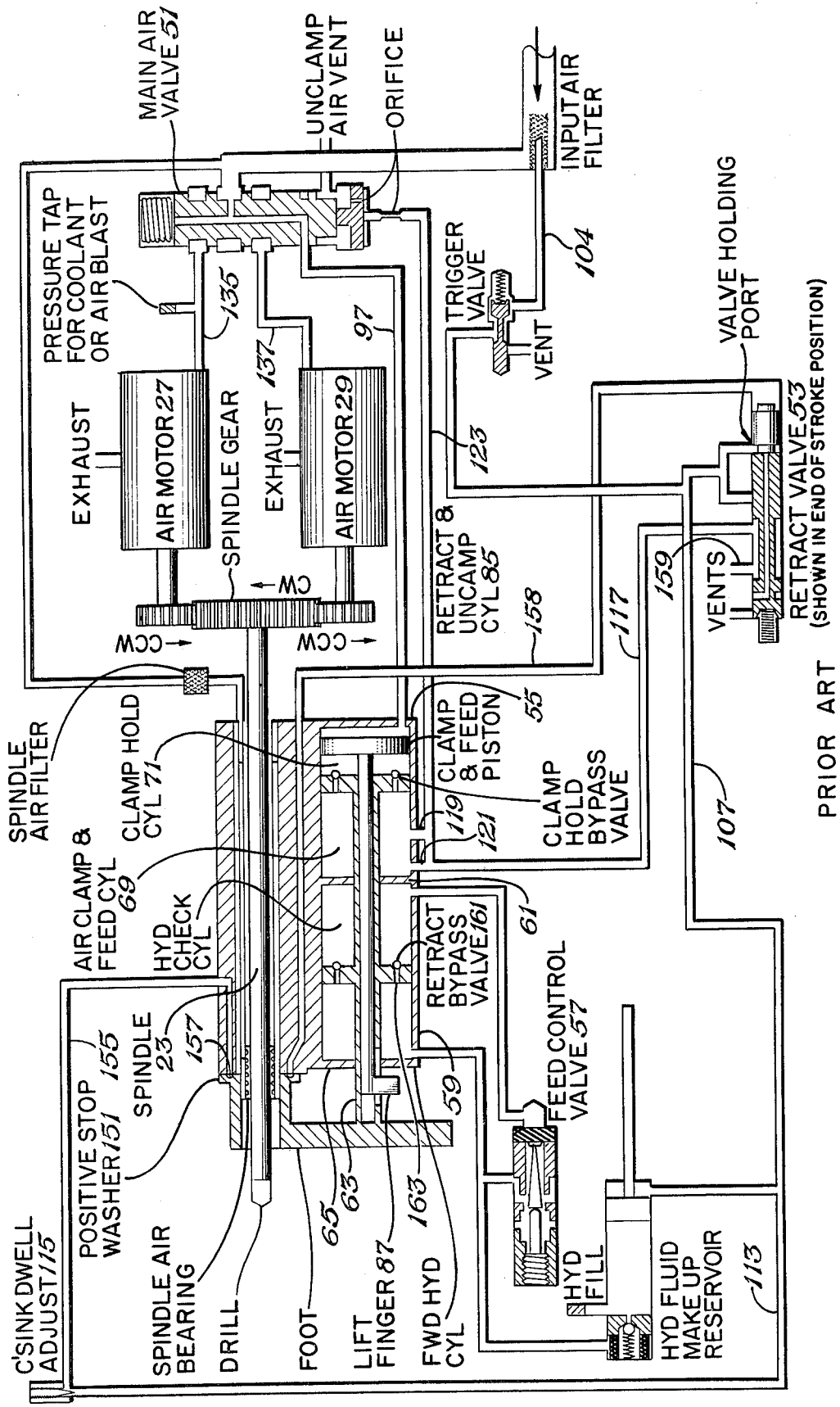
FIG. 5 illustrates the pneumatic and hydraulic systems of the drill of FIGS. 1 and 2 in the retract mode.

Referring now to FIG. 5, the retract stroke will be described. Upon completion of the feedstroke, the positive stop washer 151 is forced against the mechanical stop 153. When this occurs, air pressure from the countersink dwell adjust 115 is applied by way of conduit 155 through an annular groove 157 in the positive stop washer 151 and by way of conduit 158 to the piston end of the retract valve 53 causing the valve to shift position.

When the retract valve shifts, it shuts off the supply of air to the clamp and feed cylinder 69 and to the piston in the main air valve 51 and then vents them to atmosphere by way of conduit 123, ports 119 and 121, conduit 117, and vent 159.

Once the retract valve 53 is actuated, it is pneumatically latched in the actuated position by air pressure entering the valve between the spool and the piston. The valve remains in this position until the trigger is released.

When the main air valve 51 shifts, it shuts off the supply of air to the air motors 27 and 29 and again supplies air to the retract and unclamp cylinder 85. When the air clamp and feed cylinder 69 is vented, air remains trapped in the clamp and hold cylinder 71. This keeps the tool clamped to the workpiece until completion of the retract stroke. During the retract stroke, the housing 21 and hence the spindle 23 and drill bit 25 are moved rearward. At the end of the retract stroke, the air trapped in the clamp and hold cylinder 71 is vented to the atmosphere by way of port 119, conduit 117, retract valve 53, and vent 159, allowing the collet 37 to be released. During the retract stroke, the retract bypass valve 161 permits unrestricted flow of hydraulic fluid from the forward hydraulic cylinder 75 into the check cylinder 77. Hydraulic piston 73 is the similar to pneumatic piston 67 and comprises six apertures 163 (See FIG. 6) formed through the piston which are opened and closed by an O-ring 161 (retract bypass valve)

which acts as a one way valve. When the trigger 45 is released, the tool reverts to the standby condition.

The drill of FIGS. 1-5, has three possible drilling speeds of 3,600 rpm, 6,000 rpm, and 8,000 rpm. The speed of the drill bit may be changed by changing the sizes of the gears 31-33. The feed rate may be varied between a maximum of 0.67 inch per second to a minimum of 0.0625 inch per second by adjustment of the feed control valve 57. The retraction rate is fixed by the size of the holes 163 in the hydraulic piston 73 and is slightly less than 2 inches per second. In our operations, for drilling fastener holes in aluminum alloy airframe structures having a thickness of from 3/16 of an inch to ⅜ of an inch, we use a ¼ inch diameter drill bit and operate the drill at 6,000 rpm. The feed rate is preset to 0.143 inch per second. In the standard Winslow Spacematic Drill, upon completion of the preset feed stroke, air pressure is automatically shut off to the air clamp and feed cylinder 69 and to the air motors 27 and 29. This results is instantaneous arrest of drill bit rotation. During retraction, hydraulic fluid in the forward hydraulic cylinder 75 bleeds through apertures 163 formed through hydraulic piston 73 to the hydraulic check cylinder 77 resulting in a high rate of retraction of the drill bit through the fabricated fastener holes. These features result in axial scratches in the walls of the hole upon retraction of the drill bit which are very undesirable since they are deleterious to the fatigue life of the airframe structure. One such axial stratch formed in the wall of a hole is depicted in FIG. 7 at 171. In this Figure, reference numeral 173 identifies a frame structure through which a fastener hole 175 has been drilled. The axis of the hole is identified at 177.

DESCRIPTION OF THE PREFERRED EMBODIMENT

In accordance with the present invention, we have eliminated the formation of axial scratches previously produced during retraction by modifying the drill of FIGS. 1-5. Test results indicate an extension of the life of a given airframe may be by as much as 4,000 hours or 50%. Modification has been accomplished by positively operating one of the air motors 27, 29 during retraction and by modifying the hydraulic piston 73 to restrict the rate of retraction.

Figure 8:
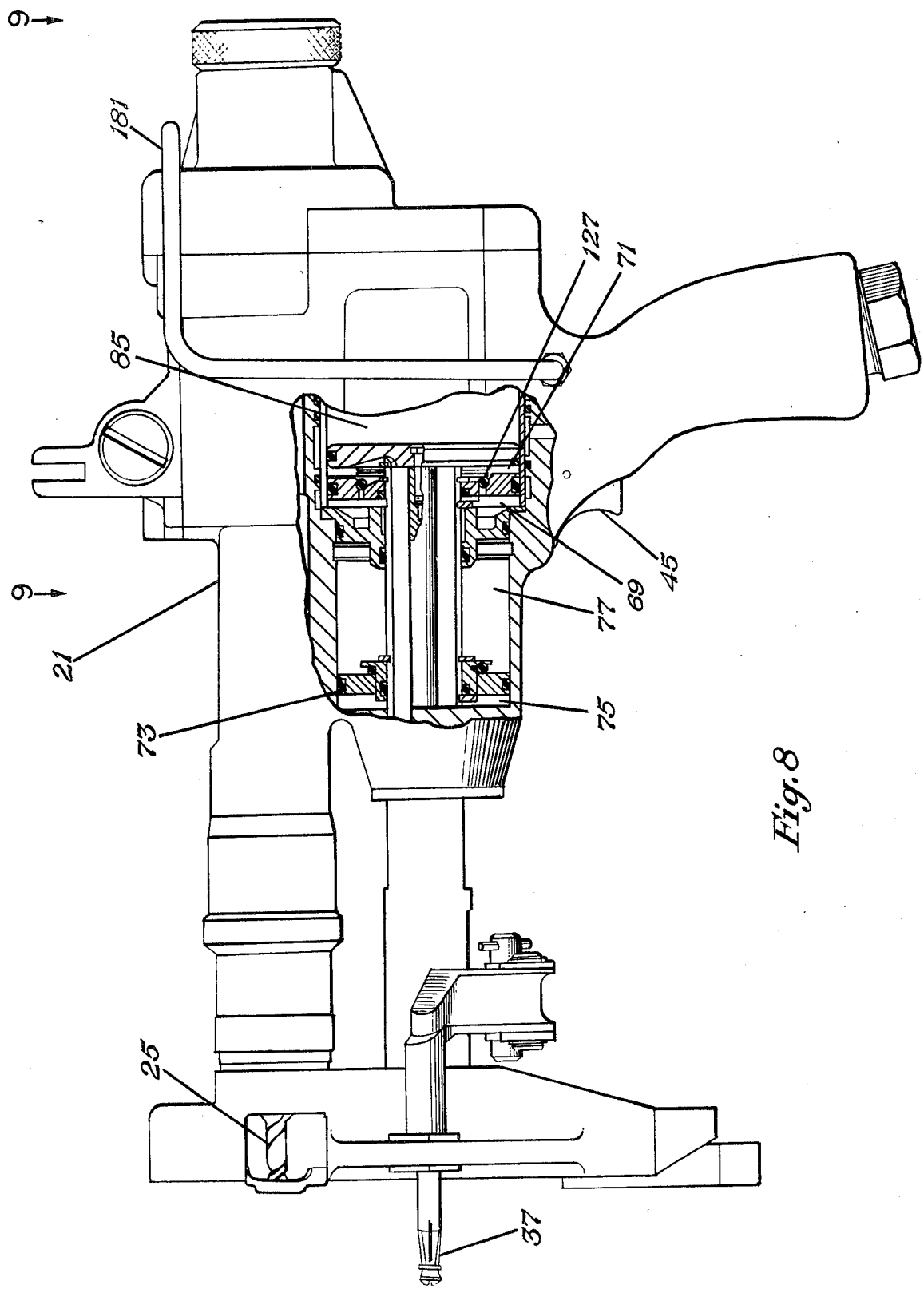
FIG. 8 is a side view of the drill of FIG. 1 illustrating the manner in which it has been modified in accordance with the present invention.
Figure 9:
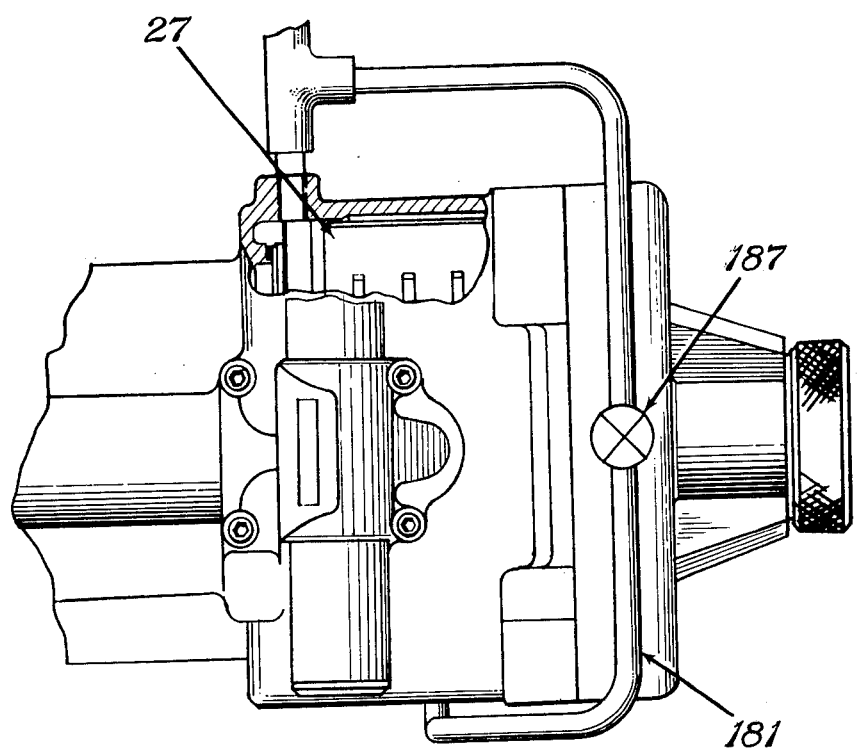
FIG. 9 is a partial top view of the modified drill of FIG. 8 taken along the lines 9—9 thereof.
Figure 12:
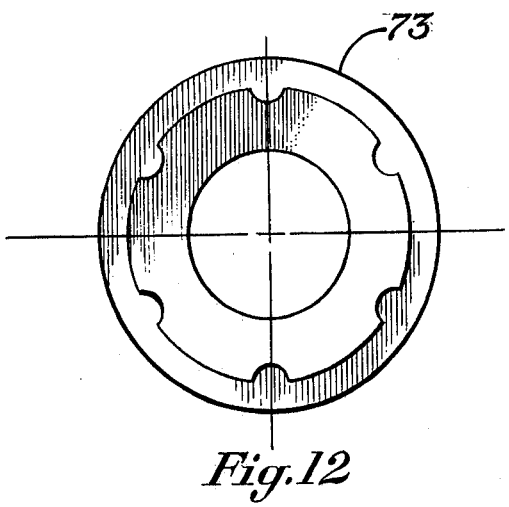
FIG. 12 illustrates the rear side of the piston of FIG. 11.

Referring to FIGS. 8-10, an auxiliary air line 181 is coupled to the air passage 95 in the handle and extends to air conduit 135 leading to the air motor 27. Line 181 is connected to the conduit 135 by way of the pressure tap 185 (See FIG. 3) leading to the conduit 135. A manually controllable valve 187 is located in line 181. by opening valve 187, line 181 permits continuous air flow to the air motor 27 and thus permits the drill bit to rotate independent of the standard cycle. In operation, the valve 187 manually is opened prior to the time that the trigger 45 is pulled and is maintained opened during the feed stroke and during the retract stroke. At the end of the retract stroke, valve 187 is closed. Thus positive pressure is applied to the air motor 27 to rotate the spindle 23 and drill bit 25 during the retract stroke whereby the drill bit is rotated as it is retracted or withdrawn from the hole. With the auxiliary air line 181 installed, the speed of rotation of the drill bit during the retract stroke has been measured at about 1600 rpm. The auxiliary line 181 does not affect the speed of rotation of the spindle and the drill bit during the feed stroke.

Thus, in the modified drill, air motor 27 is operated by line 181 to rotate the spindle and drill at less than full power (1600 rpm) prior to the beginning of the automatic cycle which is initiated by pulling the trigger 45. During the feed stroke both air motors are operated as in the standard drill to rotate the spindle and drill bit at full power (3,600 rpm, 6,000 rpm, or 8,000 rpm). During the retract stroke, motor 27 is operated by air line 181 to rotate the spindle and drill bit at less than full power (1600 rpm). Rotation of the drill bit during retraction permits the metal chips to be discarded and those that are not discarded, to be benign during withdrawal, thus preventing the formation of axial scratches during retraction.

Figure 13:
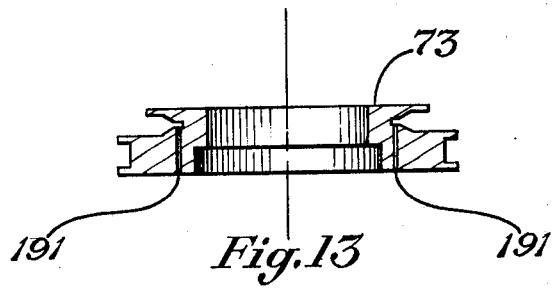
FIG. 13 is a cross-section of the piston of FIG. 11 taken along the lines 13—13 thereof.
Figure 11:
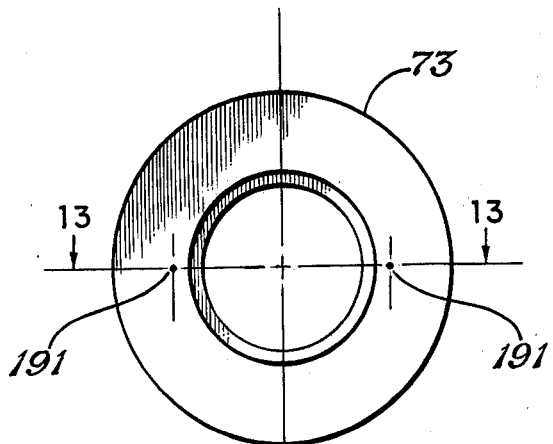
FIG. 11 illustrates the front side of the modified hydraulic piston.

The rate of retraction of the housing and hence of the spindle and drill bit has been restricted by plugging the six holes 163 in the hydraulic piston 73 and forming two smaller holes 191 through the piston. These holes are illustrated in FIGS. 11 and 13. Each of the six holes 163 had a diameter of 0.085 of an inch which allowed unrestricted flow of the hydraulic fluid from the forward hydraulic cylinder 75 to the hydraulic check cylinder 77 during retraction. By unrestricted flow is meant that the pressures in the two cylinders 75 and 77 are equal. Each of the holes 191 has a diameter of 0.030 of an inch. The resulting smaller orifice defined by the two holes 191 has resulted in a restriction of the rate of retraction of the housing and hence, of the spindle and drill bit during the retract stroke. During the retract stroke the air pressure in the retract and unclamp cylinder 85 forces part of the hydraulic fluid in the forward hydraulic cylinder 75 to flow back through the feed control valve 57 to the hydraulic check cylinder 77 while the remainder of the hydraulic fluid flows through the smaller orifice (holes 191) in the hydraulic piston 73 resulting in the slower rate of retraction. Measurements have shown that the resulting rate of retraction with the smaller holes 191 is about 0.4 of an inch per second which is about 1/5 as fast as the retraction rate of the standard tool employing the six holes 163 each of a diameter of 0.085 of an inch.

With the modified tool, the ratio of the linear velocity $V_L$ of the one fourth inch diameter drill bit at its axis relative to its rotational velocity $V_R$ at its outer surface during retraction can be calculated to be equal to 0.0191. The calculation are as follows:

$$V_L = 0.4 \text{ inch/sec.}$$

$$V_R = r\omega = \frac{[.125 \text{ in.}] (1600 \text{ rpm}) (2\pi/\text{rev.})}{(60 \text{ sec/min})} = 20.94 \text{ inch/sec.}$$

Wherein: $\omega$ is defined as radians/sec, and r is the radius of the drill bit in inches.

$$\frac{V_L}{V_R} = \frac{0.4}{20.94} = 0.0191$$

Referring to FIGS. 7 and 14, the ratio $V_L/V_R$ defines the angle $\theta$ of circumferential marks relative to a plane perpendicular to the axis of the hole which may be produced by the drill bit or chips during retraction. For a ratio of 0.0191, $\theta$ is calculated as follows:

$$\theta = \tan^{-1} (0.4/20.94) = 1.09°$$

One circumferential scratch is denoted in FIG. 7 at 172. From investigation it has been found that the ratio $V_L/V_R$ should not exceed 0.20, which value defines the largest angle $\theta$ of acceptable circumferential marks produced by the drill bit or chips during retraction. It is noted that for $V_L/V_R$ equal to 0.20, the angle $\theta$ is equal to 11.3°. As $\theta$ increases above 12° ($V_L/V_R=0.213$), the axial components of the circumferential marks begin to increase to undesirable values which begin to contribute significantly to the main cause of fatigue cracking, which as stated above, are the axial scratches. It is noted that $\theta$ equal to 1.09° is well within the acceptable limits and in fact is not much greater than the angle of circumferential marks produced by the drill bit during the feed strokes. In this respect, at 6,000 rpm and at a feed rate of 0.143 inch/sec., $V_L/V_R$ is equal to 0.143/78.54 and $\theta$ is equal to 0.104°. At 6,000 rpm and at a maximum feed rate of 0.67 inch/sec., $\theta$ is equal to 0.489°. At 6,000 rpm and a minimum feed rate of 0.0625 inch/sec., $\theta$ is equal to 0.46°. During the feed stroke, a maximum $\theta$ of 0.8° is obtainable at an rpm of 3600 and at a maximum feed stroke of 0.67 inch/sec. During the feed stroke, a minimum $\theta$ of 0.030° is obtainable at an rpm of 8000 and at a minimum feed rate of 0.0625 inch/sec. Thus during the feed stroke the limits of $\theta$ are from 0.030° to 0.8°.

Thus the Windslow Spacematic Drill has been modified to obtain an improved drilling tool. Modification has been accomplished by the provision of an auxiliary line to insure drill bit rotation of all times during retraction, and a hydraulic piston containing a controlled orifice check valve to decrease and control the rate at which the rotating drill bit is retracted from the drilled hole. The combined rotation of the drill bit and deceased retraction rate produces significantly improved fatigue behavior in fastener holes. Moreover, initial observations indicate that drill bit damage and wear on the tool is reduced. The resulting hole quality with the modified tool and process also is less susceptible to damage from dull drill bits. In other words, use of a slightly dull drill bit with the modified tool and process produces acceptable fastner hole quality.

In one embodiment, the inside diameter of the hydraulic cylinder 29 is 2.25 inches and the outside diameter of piston rod 63 is 1.00 inch.

It will be appreciated that as the orifices 191, are fixed in number and size, the speed of retraction of the drill bit in operation will be fixed at a repeatable known or determinable constant rate which may be adjusted or varied to advantage at any time to a different known or determinable rate by varying the number or size (diameter) of the orifices. Consequently holes of known quality may be automatically drilled in large numbers under manufacturing programs where high quality holes are essential. This permits a reduction in the amount and type of hole inspection.

The Winslow Spacematic Drill Models HS-1 and HS-2 also may be modified by redesigning the main air valve 51 to incorporate the constant rotation function into the system's automatic cycle. Additional modifications may also include an overrunning clutch on the shaft of the idle air motor 29 during the retraction cycle so that this air motor does not provide rotation power during retraction.

It will be understood that $\theta$ has been used to denote the angle a scratch makes with respect to a plane perpendicular to the hole axis. Any scratch can be resolved into both axial and circumferential components. Therefore, as measured from the plane, an axial scratch may be said to be one in which the axial component is the greater (i.e., between 45° to 90°) while the circumferential scratches may be said to be those in which the circumferential component is the greater (i.e., between 0° and 45°). However, "axial" may be applied to any scratch having an unacceptably large component. The present invention insures that the tool bit or drilling chips are moved during their retraction from the hole at linear velocities at the surface of the hole in a circumferential direction which sufficiently exceed their velocity axially of the hole so that any scratches produced are circumferential ones within an acceptable range of angles.

We claim:

1. A method of operating a drill of the type having two motors for rotating a drill bit, means for feeding said drill bit forward while said two motors are operated for drilling a hole in a workpiece, and means for moving said drill bit rearward for retracting said drill bit from the hole, said method comprising the steps of:
   operating said two motors for rotating said drill bit,
   while said two motors are being operated to rotate said drill bit, feeding said drill bit forward to drill a hole in the workpiece,
   after the hole is drilled, moving said drill bit rearward at a constant and known rate to retract said drill bit from the hole,
   while said drill bit is being retracted from the hole, operating only one of said motors to rotate said drill bit,
   said drill bit being moved rearward and rotated at rates respectively during retraction such that the ratio $V_L/V_R$ is less than 0.22, where $V_L$ is the linear velocity of said drill bit at its axis during retraction and $V_R$ is equal to the product of the radius of said drill bit and its angular velocity during retraction.

2. A method of operating a drill of the type having two motors for rotating a drill bit, means for feeding said drill bit forward while said two motors are operated for drilling a hole in a workpiece, and means for moving said drill bit rearward for retracting said drill bit from the hole, said method comprising the steps of:
   operating said two motors for rotating said drill bit,
   while said two motors are being operated to rotate said drill bit, feeding said drill bit forward to drill a hole in the workpiece,
   after the hole is drilled, moving said drill bit rearward to retract said drill bit from the hole,
   while said drill bit is being retracted from the hole, operating only one of said motors to rotate said drill bit,
   said drill bit being moved rearward and rotated at rates respectively during retraction such that the wall of the hole of the workpiece is free from axially aligned scratches and circumferential scratches in the wall of the hole caused by said drill bit upon retraction define an angle relative to a plane perpendicular to the axis of the hole less than about 13°.

3. In a drill of the type having a housing which supports a rotatable spindle carrying a drill bit; a workpiece engaging member, two air motors for rotating said spindle at a given minimum rpm, pneumatic cylinder means and piston means for linearly moving said housing, spindle, and drill bit relative to said workpiece engaging member during feed and retract strokes, said housing, spindle and drill bit being moved forward relative to said workpiece engaging member during the feed stroke for drilling a hole in the workpiece, said housing, spindle and drill bit being moved rearward relative to the said workpiece engaging member during the retract stroke for withdrawing said drill bit from the hole drilled in the workpiece, input air means, means for controlling the flow of air from said input air means to said pneumatic cylinder means for producing the feed and retract strokes, means for controlling the flow of air from said input air means to said two air motors for operating said two air motors during the feed stroke for rotating said spindle and drill bit, and hydraulic means for controlling the rate of forward and rearward movement of said housing and hence of said spindle and drill bit during the feed stroke and retract stroke respectively, the improvement comprising:

an auxiliary air conduit extending from said input air means to one of said air motors for operating only said one air motor during the retract stroke for rotating said spindle and hence the drill bit at a rpm less than said given minimum rpm, said hydraulic means restricting the rate of rearward movement of said housing, spindle, and drill bit during the retract stroke, whereby:

the drill bit is caused to be rotated while being retracted from the hole such that the ratio $V_L/V_R$ during retraction is less than 0.22, wherein $V_L$ is the linear velocity of the drill bit at its axis during retraction and $V_R$ is equal to the product of the radius of the drill bit and its angular velocity during retraction.

4. In a drill of the type having a housing which supports a rotatable spindle carrying a drill bit; a workpiece engaging member, two air motors for rotating said spindle at a given minimum rpm, pneumatic cylinder means and piston means for linearly moving said housing, spindle, and drill bit relative to said workpiece engaging member during feed and retract strokes, said housing, spindle and drill bit being moved forward relative to said workpiece engaging member during the feed stroke for drilling a hole in the workpiece, said housing, spindle and drill bit being moved rearward relative to the said workpiece engaging member during the retract stroke for withdrawing said drill bit from the hole drilled in the workpiece, input air means, means for controlling the flow of air from said input air means to said pneumatic cylinder means for producing the feed and retract strokes, means for controlling the flow of air from said input air means to both of said air motors for operating both of said air motors during the feed stroke, and hydraulic means for controlling the rate of forward and rearward movement of said housing and hence of said spindle and drill bit during the feed stroke and retract stroke respectively, the improvement comprising:

an auxiliary air conduit extending from said input air means to one of said air motors for operating only said one air motor during the retract stroke for rotating said spindle at an rpm less than said given minimum rpm, said hydraulic means restricting the rate of rearward movement of said housing, spindle, and drill bit during the retract stroke.

5. In a drill of the type having a housing which supports a rotatable spindle carrying a drill bit; a workpiece engaging member, two air motors for rotating said spindle at a given minimum rpm, pneumatic cylinder and piston means for linearly moving said housing, spindle, and drill bit relative to said workpiece engaging member during feed and retract strokes, said housing, spindle and drill bit being moved forward relative to said workpiece engaging member during the feed stroke for drilling a hole in the workpiece, said housing, spindle and drill bit being moved rearward relative to the said workpiece engaging member during the retract stroke for withdrawing said drill bit from the hole drilled in the workpiece, input air means, means for controlling the flow of air from said input air means to said pneumatic cylinder means for producing the feed and retract strokes, means for controlling the flow of air from said input air means to both of said air motors for operating both of said air motors during the feed stroke, and hydraulic means for controlling the rate of forward movement of said housing and hence of said spindle and drill bit during the feed stroke, the improvement comprising:

an auxiliary air conduit extending from said input air means to one of said air motors for operating only said one air motor during the retract stroke for rotating said spindle at a rpm less than said given minimum rpm, and means comprising said hydraulic means for restricting the rate of rearward movement of said housing, spindle, and drill bit during the retract stroke.

6. A drill, comprising:

a rotatable spindle for carrying a drill bit, power means comprising two motors for rotating said spindle and drill bit, means for feeding said spindle and drill bit forward during a feed stroke while said two motors are operated for drilling a hole in a work piece, means for moving said spindle and drill bit rearward for retracting the drill bit from the hole, retract power control means for causing only one of said motors to be operated during retraction for rotating said spindle and drill bit while the drill bit is being retracted from the hole, and retract rate restriction means for controlling the rate at which said spindle and drill bit are moved rearward during retraction, said retract power control means and said retract rate restriction means being employed for causing said spindle and drill bit to be rotated while the drill bit is being retracted from the hole such that the ratio $V_L/V_R$ during retraction is less than 0.22, wherein $V_L$ is the linear velocity of the drill bit at its axis during retraction and $V_R$ is equal to the product of the radius of the drill bit and its angular velocity during retraction.

7. The drill of claim 6, wherein:

said two motors rotate said spindle and drill bit during the feed stroke at a given minimum rpm, said retract power control means causes said one motor to rotate said spindle and drill bit while the drill bit is being retracted from the hole at a rpm less than said given minimum rpm.

8. A drill, comprising:

a rotatable spindle for carrying a drill bit, power means comprising two motors for rotating said spindle and drill bit, means for feeding said spindle and drill bit forward during a feed stroke while said two motors are operated for drilling a hole in a work piece, means for moving said spindle and drill bit rearward for retracting the drill bit from the hole, retract power control means for causing only one of said motors to be operated during retraction for rotating said spindle and drill bit while the drill bit is being retracted from the hole, and retract rate restriction means for controlling the rate at which said spindle and drill bit are moved rearward during retraction, said retract power control means and said retract rate restriction means being employed for causing the drill bit to be rotated while being retracted from the hole drilled in the workpiece such that the wall of the hole in the workpiece is free from axially aligned scratches and circumferential scratches in the wall of the hole caused by the drill bit upon retraction define an angle relative to a plane perpendicular to the axis of the hole less than about 13°.

9. The drill of claim 8, wherein:

said two motors rotate said spindle and drill bit during the feed stroke at a given minimum rpm, said retract power control means causes said one motor to rotate said spindle and drill bit while the drill bit is being retracted from the hole at a rpm less than said given minimum rpm.

* * * * *